United States Patent

Yao et al.

Patent Number: 6,044,737
Date of Patent: Apr. 4, 2000

[54] STATOR OF AND ARC SHAPING METHOD FOR BRUSHLESS MOTOR

[75] Inventors: Yeong-Der Yao, Taipei; Jain-Chang Wang, Miao Li Hsien; Chin-Po Liao, Yun Lin Hsien; Der-Ray Huang, Hsinchu; Chi-Mou Chao, Taipei Hsien, all of Taiwan

[73] Assignee: Industrial Technology Research Institute, Hsinchu, Taiwan

[21] Appl. No.: 08/998,598

[22] Filed: Dec. 29, 1997

[30] Foreign Application Priority Data

Apr. 2, 1997 [TW] Taiwan ................................ 86104243

[51] Int. Cl.$^7$ ........................................................ B26D 1/00
[52] U.S. Cl. ............................ 83/13; 83/35; 83/36; 29/596
[58] Field of Search .................................. 310/67 R, 254, 310/258; 83/13, 34, 35, 36, 39; 29/596

[56] References Cited

U.S. PATENT DOCUMENTS

| | | | |
|---|---|---|---|
| 3,081,412 | 3/1963 | Granier | 310/254 |
| 3,567,978 | 3/1971 | Parker | 310/124 |
| 3,777,191 | 12/1973 | Papst et al. | 310/67 R |
| 3,860,843 | 1/1975 | Kawasaki et al. | 310/67 R |
| 4,797,592 | 1/1989 | England | 310/254 |
| 4,965,476 | 10/1990 | Lin | 310/67 R |
| 5,030,864 | 7/1991 | Van Hout et al. | 310/67 R |
| 5,057,733 | 10/1991 | Sonoda et al. | 310/67 R |
| 5,212,419 | 5/1993 | Fisher et al. | 310/254 |
| 5,233,250 | 8/1993 | De Filippis | 310/254 |
| 5,331,245 | 7/1994 | Burgbacher et al. | 310/254 |
| 5,739,614 | 4/1998 | Suzuki et al. | 310/254 |
| 5,844,346 | 12/1998 | Kolomeitsev et al. | 310/254 |

*Primary Examiner*—M. Rachuba
*Attorney, Agent, or Firm*—Rabin & Champagne, P.C.

[57] ABSTRACT

A new type of stator design and arc shaping method that is used in a diametrically wound and diametrical air gap type of brushless motor. After arc shaping, the stator of this brushless motor has an external profile composed of a central arc and two modified arcs located on each side of the central arc. The central arc subtends an angle twice that of angle A and the modified arcs each has a radius r, both angle A and r are given by the following formulae:

$$\frac{5}{33}\left(\frac{360°}{N} - b0\right) \leq A \leq \frac{1}{3}\left(\frac{360°}{N} - b0\right);$$

$$\frac{2R(R-t)(1-\cos\theta) + t^2}{2[R - (R-t)\cos\theta]} \leq r \leq \frac{2R\left(R - \frac{t}{4}\right)(1-\cos\theta) + \left(\frac{t}{4}\right)^2}{2\left[R - \left(R - \frac{t}{4}\right)\cos\theta\right]};$$

$$\theta = \frac{180°}{N} - \frac{b0}{2} - A$$

Through arc shaping the stator, the cogging torque is lowered while a certain standard value for the torque constant is still maintained. Thus, the overall efficiency of the brushless motor is raised.

4 Claims, 7 Drawing Sheets

STATOR OF AND ARC SHAPING METHOD FOR BRUSHLESS MOTOR

BACKGROUND OF THE INVENTION

1. Field of Invention

The present invention relates to a new type of stator design and arc shaping method for brushless motors. More particularly, the present invention relates to a stator design and arc shaping method for diametrically wound and diametrical air gap type of brushless motors.

2. Description of Related Art

Since brushless motors have properties that allow them to be miniaturized and flattened, they are now extensively used inside small and high precision automatic machines. At present, permanent magnet brushless motors can be classified into three main types, namely: a diametrically wound and diametrical air gap type, a diametrically wound and axial air gap type, and an axially wound and axial air gap type. Most high speed CD-ROMs use three-phase diametrically wound and diametrical air gap type of brushless motors. It does not matter if the motor has an 8-poles/9-grooves or a 12-poles/9- grooves configuration, the stator always contains a number of radiating teeth having grooves formed in each. Coils are wound round the belly of the teeth. To increase the efficiency of a diametrically wound and diametrical air gap type of brushless motor, saturated magnets are often used in substitution for ordinary permanent magnets. Due to a magnetic cross-linking between the permanent magnets and the stator, the so-called cogging torque is produced in the motor. When saturated magnets are used inside the motor, cogging torque will be increased. A larger cogging torque can adversely affect the operation of the motor, leading to vibrations, noises, a reduced motor life and operational instability. If motor having an oversized cogging torque is used, for example, in a CD-ROM or a hard disk, there will be substantial rotational speed variation. This may result in poor data reading and writing quality.

Conventionally, there are a number of patents directed towards the cogging torque problem of brushless motors. For example, U.S. Pat. Nos. 4,769,567, 4,847,712, 5,013,953, and 5,030,864 are all attempts to reduce cogging torque. To reduce cogging torque, one must analyze the motor structure, and improves either the stator design or the rotor design. U.S. Pat. No. 5,030,864, for example, seeks to change the groove opening size of a stator to obtain a lower cogging torque. Although the reduction of cogging torque is achieved as stated, a larger groove opening means a lessening of winding space available. Besides, the reduction of magnetic flux into the stator will lower the overall performance of a motor. In U.S. Pat. No. 5,250,867, holes are punched in the periphery of the silicon steel sheet; and in U.S. Pat. No. 4,672,253, rectangular grooves are ground in the silicon steel sheet to lower the cogging torque. However, when the above two methods are applied to the fabrication of a small motor such as the one used in a CD-ROM, the techniques are too complicated.

In light of the foregoing, there is a need in the art to provide an improved stator design.

SUMMARY OF THE INVENTION

Accordingly, the present invention is directed to providing an arc shaping method for the stator of a brushless motor such that an optimal stator profile, and hence a lower cogging torque is obtained. Therefore, the overall motor efficiency is raised.

To achieve these and other advantages and in accordance with the purpose of the invention, as embodied and broadly described herein, the invention provides an arc shaping method for the stator that is suitable for three-phase diametrically wound and diametrical air gap type of brushless motors, and having a ratio of the number of permanent magnetic poles in the rotor to the number of salient poles in the stator of either 4:3 or 2:3. The stator includes a flat plate comprising a circular central hole having a first center point O; a plurality of salient poles surrounding the circular hole, each salient pole having an identical and symmetrical appearance; groove openings between every two neighboring salient poles. The arc shaping method of this invention comprises the steps of drawing symmetrical lines OP from the first center point O to each salient pole; then, drawing auxiliary lines OB and OC from the first center point O radiating out to each side symmetrically about line OP and subtending identical angles with line OP, such that lines OB and OC intersect with the outer rim of the salient pole at point B and point C, respectively. Next, a second center point O1 is made at a distance r from the point B on the auxiliary line OB. Similarly, a third center point O2 is made at a distance r from the point C on the auxiliary line OC. Thereafter, using the second center point O1 and the third center point O2 as arc centers and distance r as radius, arcs are drawn outward from auxiliary lines OB and OC and intersect with the side edges of the salient pole at points F and G, respectively. Thus, arc BF and arc CG are formed. In the subsequent step, portions of the salient pole outside the arcs BF and CG is trimmed away.

In another aspect, the present invention is directed to providing an arc shaping method for producing a stator that can be installed inside a three-phase diametrically wound and diametrical air gap type of brushless motor, and having a ratio of the number of permanent magnetic poles to the number of salient poles in the stator of either 4:3 or 2:3. The stator includes a flat plate comprising a circular central hole having a first center point; a plurality of salient poles surrounding the circular hole; a groove opening between every two neighboring salient poles. Each salient pole has an identical and symmetric appearance, and having an axis of symmetry with respect to the first center point. The salient pole of a stator has a neck section for coil windings, and a teeth section. Profile at the outer rim of the teeth section includes a central arc, a first modified arc and a second modified arc. The central arc is formed by using the first center point as the arc center, and drawing symmetrically outward in both directions from the axis of symmetry. The central arc has two end points, namely, a first end point and a second end point. The first end point is used as a starting point for drawing the first modified arc. The arc center of the first modified arc is on the line segment between the first end point and the first center point. Similarly, the second end point is used as a starting point for drawing the second modified arc. The arc center of the second modified arc is on the line segment between the second end point and the first center point. Both the first and the second modified arcs have the same radius. Angle subtended by the central arc is 2A, where A is preferably within the limits set by the following formula:

$$\frac{5}{33}\left(\frac{360°}{N} - b0\right) \le A \le \frac{1}{3}\left(\frac{360°}{N} - b0\right);$$

where A is half the angle subtended by the central arc; N is the number of salient poles of the stator; and b0 is the angle subtended by the groove opening. Furthermore, radius r of the first modified arc and the second modified arc are preferably within the limits set by the following formula:

$$\frac{2R(R-t)(1-\cos\theta)+t^2}{2[R-(R-t)\cos\theta]} \leq r \leq \frac{2R\left(R-\frac{t}{4}\right)(1-\cos\theta)+\left(\frac{t}{4}\right)^2}{2\left[R-\left(R-\frac{t}{4}\right)\cos\theta\right]};$$

$$\theta = \frac{180°}{N} - \frac{b0}{2} - A$$

where R is the radius of the central arc; and t is the thickness at the edge of the teeth section.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
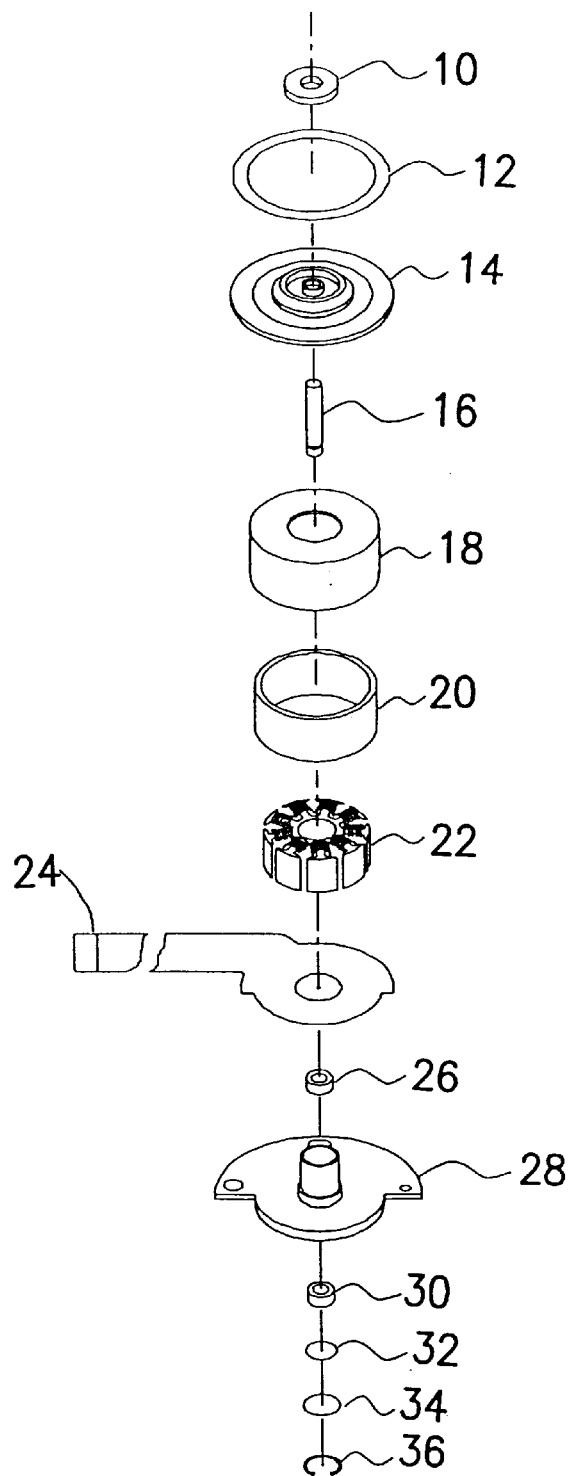
FIG. 1 is an exploded view showing the components of a conventional three-phase diametrically wound and diametrical air gap type of brushless motor.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an exploded view showing the components of a conventional three-phase diametrically wound and diametrical air gap type of brushless motor. As shown in FIG. 1, a conventional three-phase diametrically wound and diametrical air gap type of brushless motor comprises a magnetic iron ring 10, a rubber ring pad 12, a supporting plate 14, a shaft 16, a bracketing iron 18, a permanent magnet rotor 20, a stator 22, a circuit board 24, a first bearing 26, a base plate 28, a bearing second 30, a sliding sheet 32, a pad sheet 34 and a retainer ring 36. The permanent magnet rotor 20 is composed of a plurality of permanent magnets. The permanent magnets are arranged in such a way that the N pole of one magnet sits next to the S pole of a neighboring one and vice versa alternately until all available space around the rotor is filled.

Figure 2:
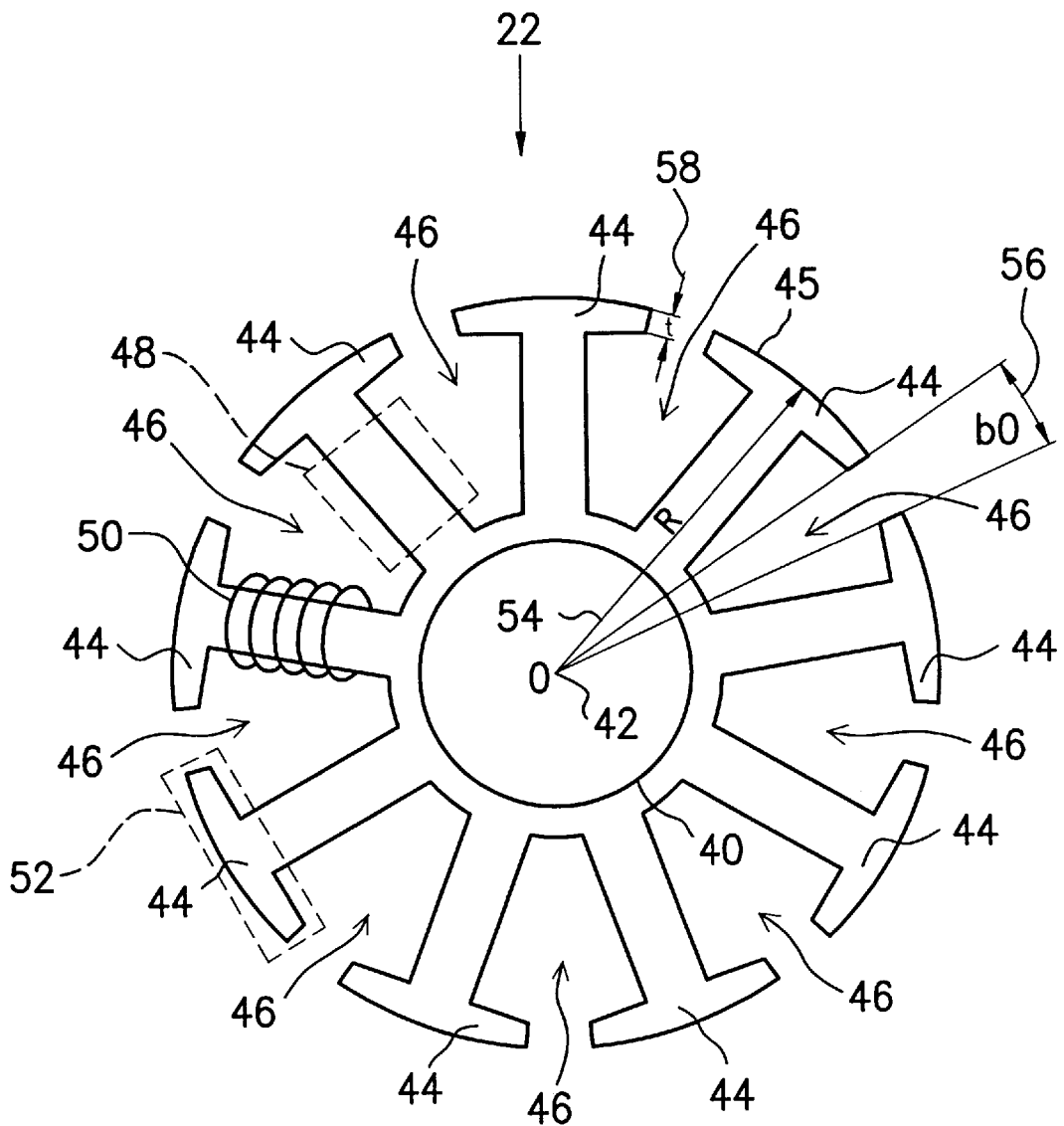
FIG. 2 is a detail structural diagram of the stator of a brushless motor.

Detail of the stator 22 is shown in FIG. 2. The stator 22 is constructed from a flat plate made from magnetic material such as silicon steel. The flat plate has a profile that includes: a circular hole 40 at the center, a first center point O (labeled 42 in FIG. 2), a plurality of salient poles 44 around the circular hole 40, and a groove opening between every two neighboring salient poles 44. Every salient pole 44 has an identical and symmetric external appearance. According to the shape and function, each salient pole can be roughly divided into two sections, namely, a coil winding neck section 48 for putting coils 50 around, and a teeth section 52 mainly for receiving magnetic flux from the magnetic poles. The outer rim 45 of the teeth section 52 is an arc formed by using the first center point O as a center and R (labeled 54 in FIG. 2) as a radius. The tooth of a teeth section has an edge thickness of t. The angle 56 subtended by each groove opening 46 is b0.

Figure 3:
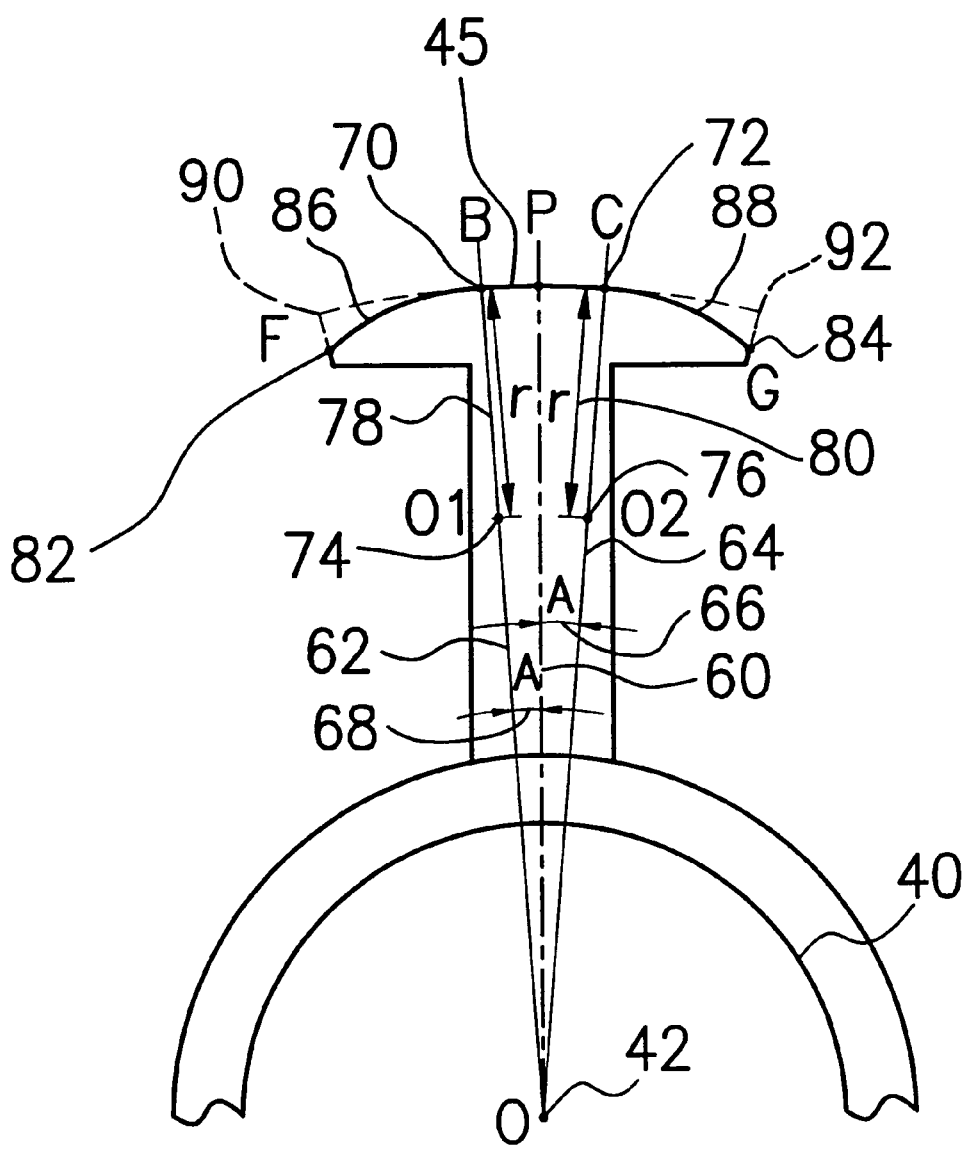
FIG. 3 shows the method to construct the shaping arc of stator according to one preferred embodiment of this invention.

Conventionally, the outer rim 45 of the teeth section 52 is a single arc. Since the stator with this type of teeth profile has a large cogging torque, the present invention is directed to shape the arc of the teeth section 52 of a stator that has a ratio of the number of permanent magnetic poles in the rotor to the number of salient poles in a stator of 4:3 or 2:3. FIG. 3 shows the method to construct the shaping arc of stator according to one preferred embodiment of this invention. As shown in FIG. 3, the arc shaping method comprises the steps of (in the following, only one salient pole of a stator is considered to illustrate the arc shaping method):

(1) forming a line OP (line 60 in FIG. 6) that divides the externally symmetrical salient pole profile into two symmetrical halves by drawing from the first center point O to a point P;

(2) drawing auxiliary line OB (labeled 62 in FIG. 3) and auxiliary line OC (labeled 64 in FIG. 3) from the first center point O to point B and C, are on each side of the symmetrical line OP such that each auxiliary line forms an angle A (labeled 66 and 68 in FIG. 3) with line OP, and that the auxiliary line OB and auxiliary line OC intersect the outer rim 45 of the salient pole at a point B (labeled 70 in FIG. 3) and a point C (labeled 72 in FIG. 3), respectively;

(3) forming a center point O1 (labeled 74 in FIG. 3) along the auxiliary line OB at a distance r (labeled 78 in FIG. 3) from the point B; and similarly, forming a center point O2 (labeled 76 in FIG. 3) along the auxiliary line OC also at a distance r (labeled 80 in FIG. 3) form the point C;

(4) using center point O1 and center point O2 as arc centers, drawing arcs outward away from auxiliary line OB and auxiliary line OC and cutting the side edges of the salient pole at a point F (labeled 82 in FIG. 3) and a point G (labeled 84 in FIG. 3), thus forming arc BF (labeled 86 in FIG. 3) and arc CG (labeled 88 in FIG. 3), respectively;

(5) trimming away portions of the original salient pole that lie outside the arc BF and arc CG (labeled 90 and 92 in FIG. 3).

Up to this point, an optimized stator profile for a brushless motor according to the present invention is obtained. The optimized stator profile includes:

(1) a central arc (that is, arc BC), wherein the central arc is obtained by drawing an arc outward from the symmetrical axis OP using the first center point O as an arc center, and terminating at a first end point B and a second end point C, respectively;

(2) a first modified arc BF, wherein the first modified arc BF is obtained by drawing an arc outward from the first end point B in a direction away from the central arc BC using a center point O1 that lies on the line formed by the first end point B and the first center point O as an arc center;

(3) a second modified arc CG, wherein the second modified arc CG is obtained by drawing an arc outward from the second end point C in a direction away from the central arc BC using a center point O2 that lies on the line formed by the second end point C and the first center point O as an arc center; and radius r of both the first modified arc and the second modified arc are the same.

Figure 4:
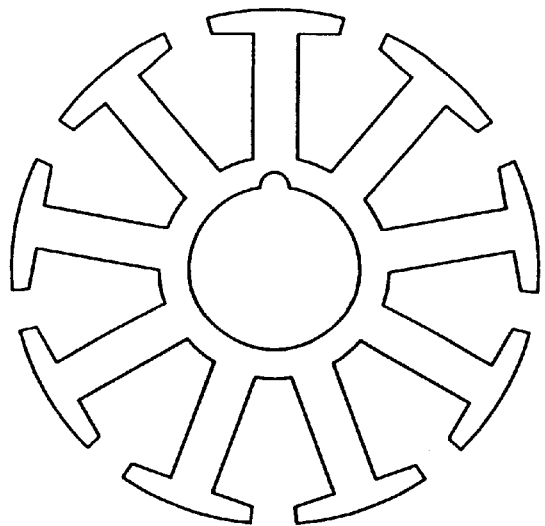
FIG. 4 is an external profile of the stator before arc shaping.
Figure 5:
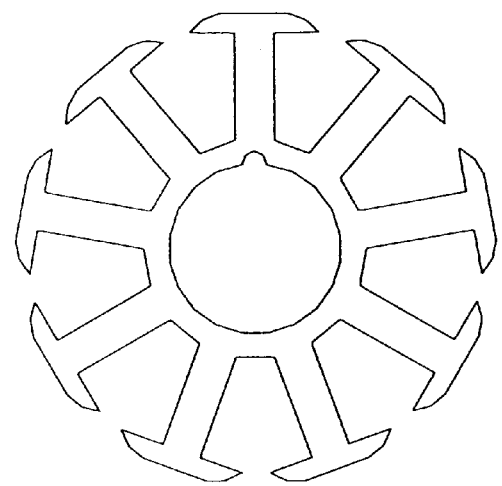
FIG. 5 is an external profile of the stator after arc shaping.

FIG. 4 is an external stator profile before arc shaping, and FIG. 5 is an external stator profile after arc shaping.

As a summary, when the groove opening angle b0 is fixed, if a set of optimal values for angle A and r are provided, an optimized stator profile can be obtained following the procedure described above.

Figure 6:
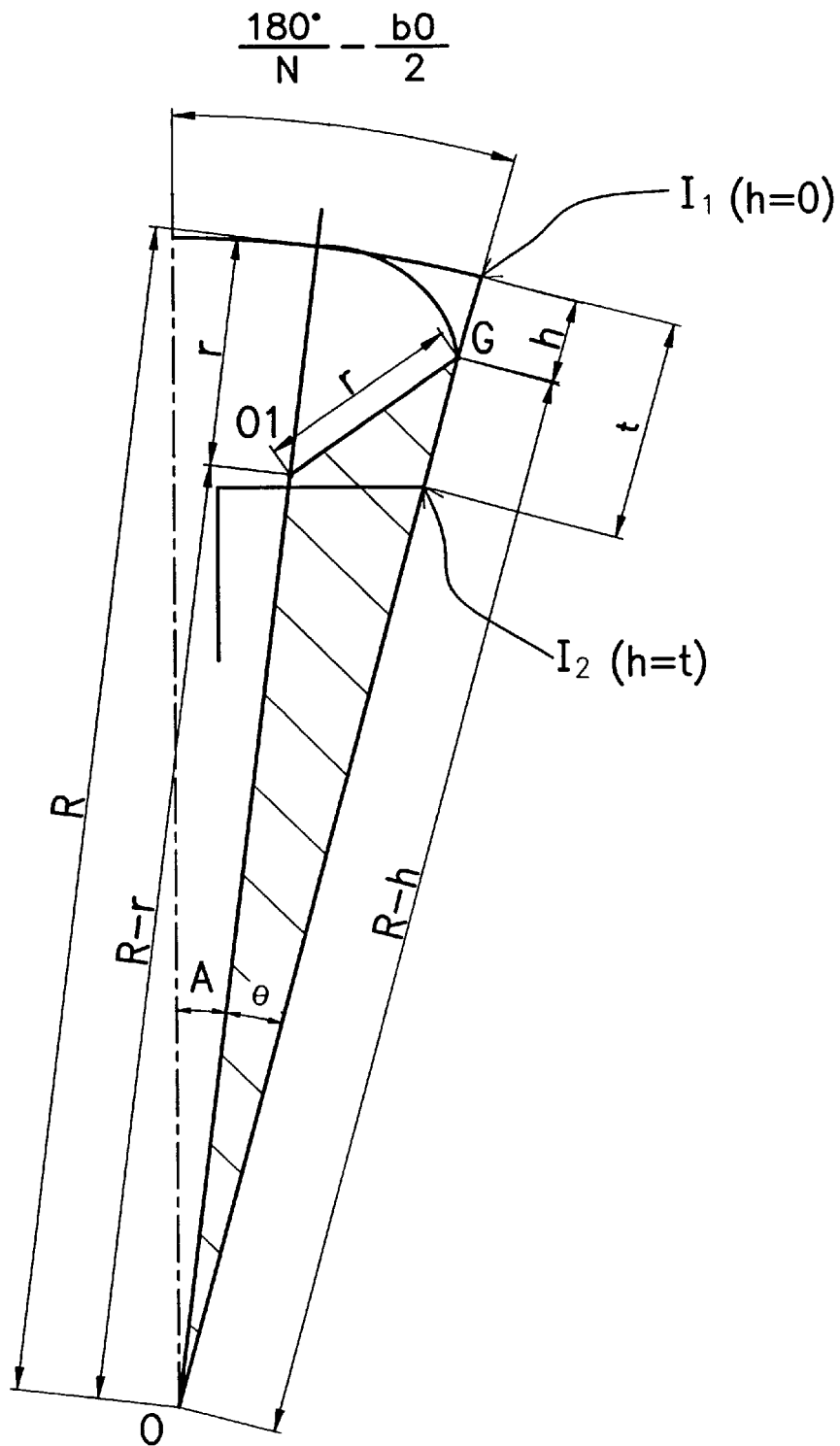
FIG. 6 is a diagram showing the geometric relationship between the angle A and radius r of a portion of the salient pole.

FIG. 6 is a diagram showing the geometric relationship between the angle A and radius r of a portion of the salient pole. As shown in FIG. 6, for a three-phase diametrically wound and diametrical air gap type of brushless motor that has a ratio of the number of permanent magnetic poles to the number of salient poles of 4:3 or 2:3, as soon as the groove opening angle b0, the outer radius of the stator R, thickness at the edge of teeth t are all fixed, an optimal angle A is found from theoretical and experimental consideration to be within the limits set by the following formula:

$$\frac{5}{33}\left(\frac{360°}{N} - b0\right) \leq A \leq \frac{1}{3}\left(\frac{360°}{N} - b0\right);$$

where A is half the angle subtended by the central arc; N is the number of salient poles of a stator; and b0 is the angle subtended by the groove opening.

As soon as angle A is fixed, the starting point C for arc modification can be determined. If the end point G of arc modification is also fixed, radius r can be calculated by pure geometrical consideration to be:

$$r = \frac{2R(R-h)(1-\cos\theta) + h^2}{2[R - (R-h)\cos\theta]};$$

$$\theta = \frac{180°}{N} - \frac{b0}{2} - A;$$

where h is the distance from the outer rim of the teeth to the terminating point of the modified arc.

The value of h is normally between zero and t. In FIG. 6, $I_1$ is the point when h=0 and $I_2$ is the point when h=t. From theoretical consideration and experimental analysis, the radius r obtained when h lies between t/4 and t has a better arc shaping result. Hence, the optimized radius r for arc shaping is preferably between the limits set by the following formula:

$$\frac{2R(R-t)(1-\cos\theta) + t^2}{2[R - (R-t)\cos\theta]} \leq r \leq \frac{2R\left(R - \frac{t}{4}\right)(1-\cos\theta) + \left(\frac{t}{4}\right)^2}{2\left[R - \left(R - \frac{t}{4}\right)\cos\theta\right]};$$

$$\theta = \frac{180°}{N} - \frac{b0}{2} - A$$

An example using the arc shaping method of this invention is given here. In the example, a three-phase diametrically wound and diametrical air gap type of brushless motor is chosen. The brushless motor uses a MQ twelve-pole rotor and a nine-pole stator. The groove opening angle b0 of the stator is 7°, and radius R is 9.75 mm. For these settings, the optimal angle A is found to be in the range 5° to 11°, and the optimal r/R ratio is found to be in the range between 0.05 to 0.37. In this embodiment, the angle A is chosen to be 8°, the arc shaping radius r is chosen to be 1.83mm (r/R ratio of about 0.19), and a current of about 0.001 Amp is passed when testing is conducted.

Figure 7:
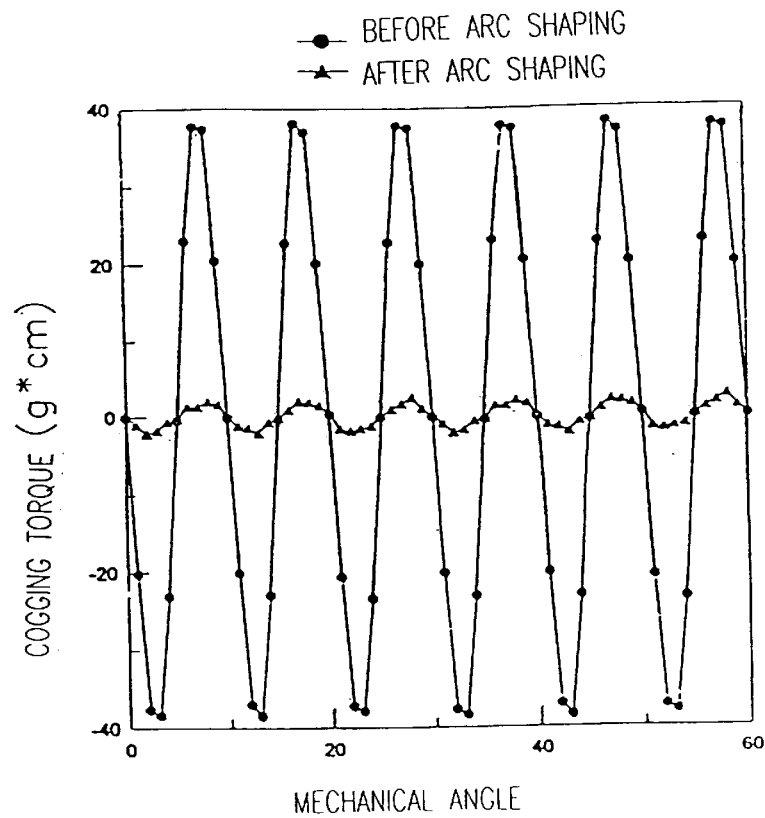
FIG. 7 is a graph showing the functional relationships between cogging torque and mechanical angle both before and after arc shaping.
Figure 8:
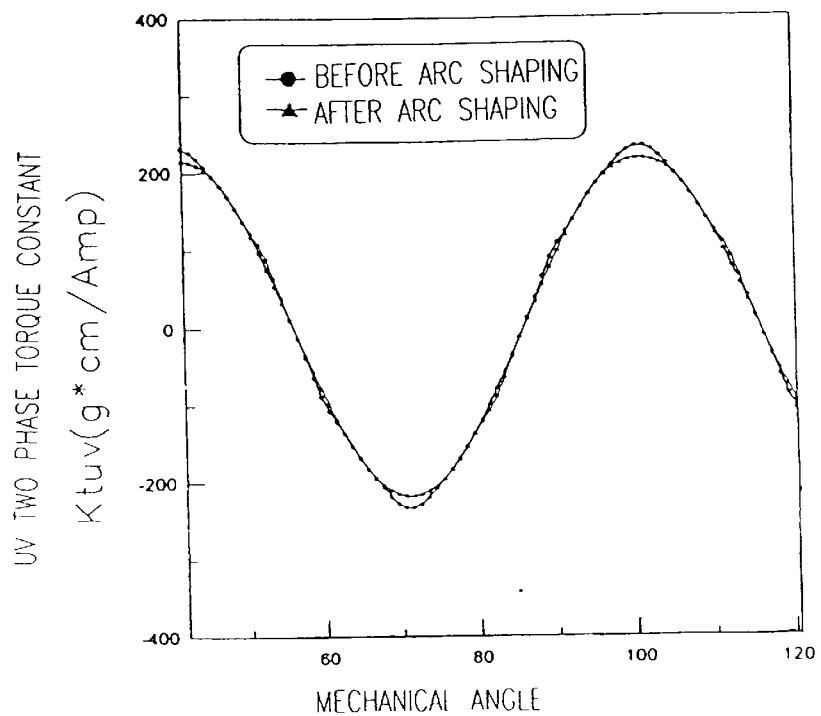
FIG. 8 is a graph showing the functional relationships between uv two-phase torque constant $K_{uv}$ and mechanical angle both before and after arc shaping.
Figure 9:
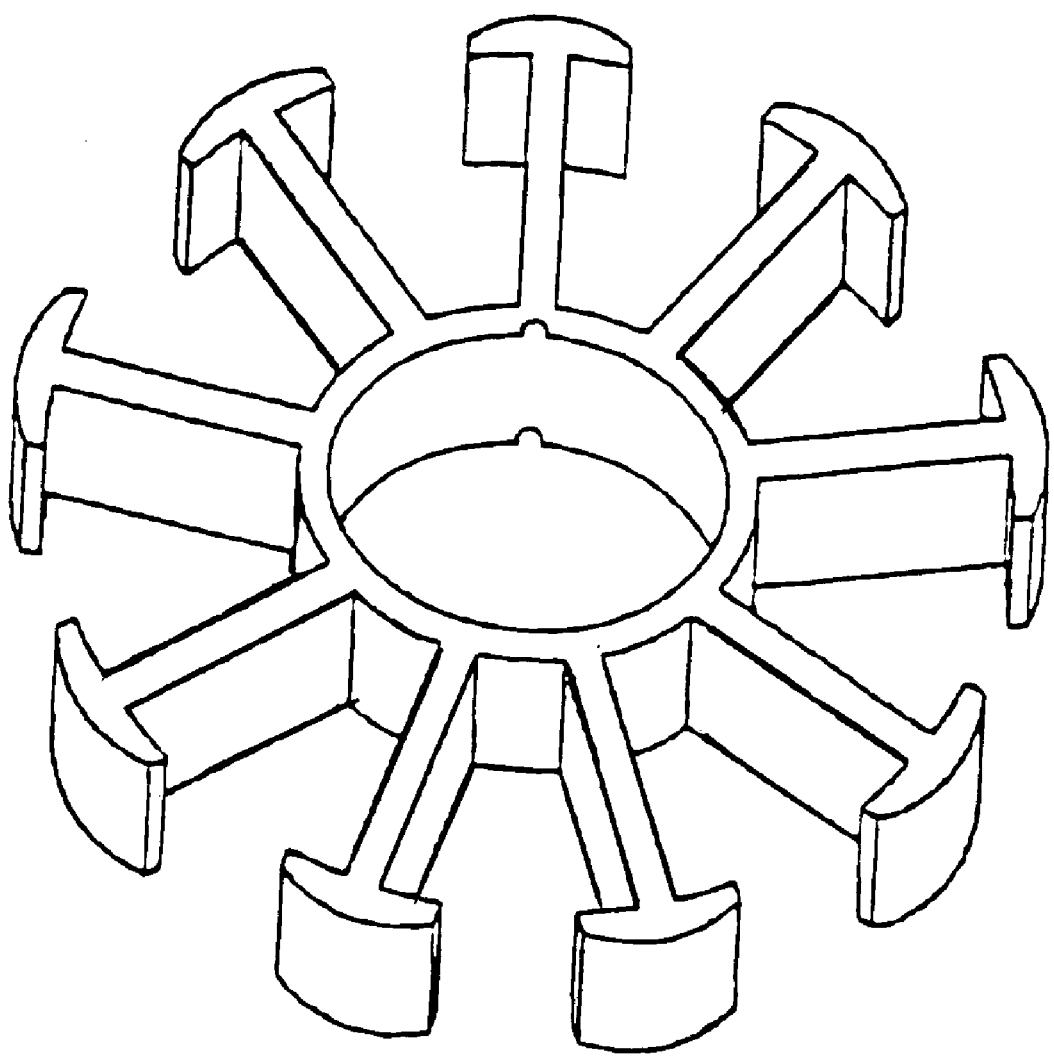
FIG. 9 is a perspective view of the stator after arc shaping.

FIG. 7 is a graph showing the functional relationships between cogging torque and mechanical angle both before and after arc shaping; and FIG. 8 is a graph showing the functional relationships between uv two-phase torque constant $K_{tuv}$ and mechanical angle both before and after arc shaping.

Through arc shaping, magnetic resistance of the stator has improved. Therefore, the cogging torque is correspondingly lowered. On the other hand, the magnetic resistance in the air gaps has increased, thereby leading to a reduction of magnetic flux going into the stator. However, because only a small portion of the stator is trimmed away, and a relatively smooth surface is obtained after arc shaping using the method of this invention, the value of the torque constant does not lower too much. As shown in FIG. 7, the cogging torque (peak-to-peak) before arc shaping in about 8.15 g*cm, but the cogging torque (peak-to-peak) after arc shaping is only about 4.04 g*cm. As shown in FIG. 8, the uv two-phase torque constant before arc shaping has an average value of about 215.17 g*cm/Amp, the uv two-phase torque constant after arc shaping has an average value of about 206.93 g*cm/Amp. From the above figures, it can be seen that the uv two-phase torque constant is lowered by about 4% only, but the cogging torque is lowered by about 90%.

Therefore, arc shaping the stator with the method of this invention is capable of lowering the cogging torque of a brushless motor while a certain standard average value of the uv two-phase torque constant is still maintained. Hence, the overall efficiency of the brushless motor is raised.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for shaping tooth sections of each of a plural number N of identical salient poles of a stator, the stator to be installed inside a three-phase diametrically wound and diametrical air gap type of brushless motor having a rotor with a number of permanent magnetic poles, the value N being such that the ratio of permanent magnetic poles to salient poles is either 4:3 or 2:3, the method comprising:

identifying a distance t between an inner rim and an unmodified outer rim of the tooth sections at an edge of the tooth sections, the unmodified outer rim having a radius R measured from a center point of the stator;

identifying an angle b0 defined by a groove between neighboring salient poles; and for each salient pole drawing a pole dividing line from the stator center point to a center point on the unmodified outer rim, thereby dividing the salient pole into symmetrical halves, identifying a first symmetrical point on the left side of the pole dividing line and a corresponding second symmetrical point on the right side of the pole dividing line, drawing first and second auxiliary lines from the stator center point respectively to the first and the second symmetrical points, wherein the pole dividing line and the first auxiliary line, as well as the pole dividing line and the second auxiliary line, are separated by an angle A, identifying a first auxiliary line center point and a second auxiliary line center point, wherein the first and the second auxiliary line center points are respectively spaced apart from the first and the second symmetrical points by a distance r, drawing a first arc having a radius equal to distance r, and centered at the first auxiliary line center point, in an outward direction from the first auxiliary line so as to intersect a left edge of the tooth section at a first intersection point, wherein the outer rim and the first intersection point are separated by a distance h, drawing a second arc having a radius equal to distance r, and centered at the second auxiliary line center point, in an outward direction from the first auxiliary line so as to intersect a right edge of the tooth section at a second intersection point, wherein the outer rim and the first intersection point are separated by a distance h, wherein the value A is within the limits set by the following formula:

$$\frac{5}{33}\left(\frac{360°}{N} - b0\right) \leq A \leq \frac{1}{3}\left(\frac{360°}{N} - b0\right),$$

wherein the value h is between the value t/4 and t, so that the value r is within the limits set by the following formula:

$$\frac{2R(R-t)(1-\cos\theta) + t^2}{2[R - (R-t)\cos\theta]} \leq r \leq \frac{2R\left(R - \frac{t}{4}\right)(1-\cos\theta) + \left(\frac{t}{4}\right)^2}{2\left[R - \left(R - \frac{t}{4}\right)\cos\theta\right]},$$

where $$\theta = \frac{180°}{N} - \frac{b0}{2} - A,$$

and removing portions of the tooth section that are outside the first arc and the second arc to form a modified outer rim.

2. The method of claim 1, wherein the flat plate is made from material that includes silicon steel.

3. A method for shaping tooth sections of each of a plural number N of identical salient poles of a stator, the stator to be installed inside a three-phase diametrically wound and diametrical air gap type of brushless motor having a rotor with a number of permanent magnetic poles, the value N being such that the ratio of permanent magnetic poles to salient poles is either 4:3 or 2:3, the method comprising:

identifying a distance t between an inner rim and an unmodified outer rim of the tooth sections at an edge of the tooth sections, the unmodified outer rim having a radius R measured from a center point of the stator;

identifying an angle b0 defined by a groove between neighboring salient poles; and for each salient pole forming a central arc having a radius R from the stator center point, symmetrically outward in both directions from an axis of symmetry to identify a first end point and a second end point on the unmodified outer rim, the central arc having an angle 2A, forming a first modified arc centered at a point a distance r from the first end point on a line segment between the first end point and the stator center point, from the first end point in a direction away from the central arc so as to intersect a first edge of the tooth section at a first terminating point, wherein the outer rim and the first terminating point are separated by a distance h, forming a second modified arc centered at a point a distance r from the second end point on a line segment between the second end point and the stator center point, from the second end point in a direction away from the central arc so as to intersect a second edge of the tooth section at a second terminating point, wherein the outer rim and the second terminating point are separated by a distance h, wherein the value A is within the limits set by the following formula:

$$\frac{5}{33}\left(\frac{360°}{N} - b0\right) \leq A \leq \frac{1}{3}\left(\frac{360°}{N} - b0\right),$$

wherein the value h is between the value t/4 and t, so that the value r is within the limits set by the following formula:

$$\frac{2R(R-t)(1-\cos\theta) + t^2}{2[R - (R-t)\cos\theta]} \leq r \leq \frac{2R\left(R - \frac{t}{4}\right)(1-\cos\theta) + \left(\frac{t}{4}\right)^2}{2\left[R - \left(R - \frac{t}{4}\right)\cos\theta\right]},$$

where $$\theta = \frac{180°}{N} - \frac{b0}{2} - A,$$

and removing portions of the tooth section that are outside the first arc and the second arc to form a modified outer rim.

4. The method of claim 3, wherein the flat plate is made from material that includes silicon steel.

* * * * *